United States Patent Office 3,455,995
Patented July 15, 1969

3,455,995
OXYALKYLATION PROCESS OF POLYESTERS
Russel A. Bowman, Clarence, and Bruce N. Wilson, Niagara Falls, N.Y., assignors to Hooker Chemical Corporation, Niagara Falls, N.Y., a corporation of New York
No Drawing. Continuation-in-part of application Ser. No. 155,832, Nov. 29, 1961. This application June 30, 1966, Ser. No. 561,686
Int. Cl. C07c 67/00
U.S. Cl. 260—468                                 7 Claims

ABSTRACT OF THE DISCLOSURE

An improved process is provided for the oxyalkylation of an active hydrogen-containing material which contains hydroxyl groups with an alkylene oxide in the presence of a catalytic amount of a catalytic composition consisting essentially of a metal alcoholate containing

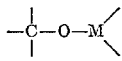

linkages and a carrier therefor. The catalytic composition is prepared by reacting an alcohol having at least three hydroxyl groups with an antimony or bismuth compound, such as antimony oxide or bismuth oxide, wherein the components are employed in a ratio sufficient to provide at least 1.5 moles of the alcohol for each unit atomic weight of the metallic element.

The compounds produced by the claimed process are useful as intermediates in the production of polyesters and urethane foams.

---

This is a continuation-in-part of application Ser. No. 155,832, filed Nov. 29, 1961, now abandoned.

This invention relates to the oxyalkylation of active hydrogen-containing materials by processes which use an improved catalyst composition.

Substantially pure, novel organic compounds of antimony and bismuth have been prepared recently having the following structural formulae:

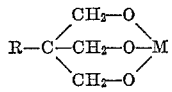

or

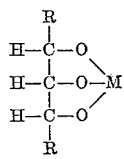

wherein R is selected from the group consisting of hydrogen, alkyl, substituted alkyl, aryl, substituted aryl, and mixtures thereof, and M is a metal selected from the group consisting of antimony and bismuth. Such compounds are disclosed in the United States Patent No. 3,109,853.

The above compounds are highly crystalline and of such limited solubility in ordinary solvents that their purification has been limited to sublimation as a final purification step, and the entire purification process has been so involved that the expense of pure compounds is prohibitively high. Nevertheless, the purification steps have been considered to be essential heretofore in order to produce a pure specific compound that would be useful for many purposes normally requiring a pure known substance. For instance, one large use for the above antimony and bismuth compounds that heretofore was thought to yield better results in the form of a specific pure substance is as a catalyst for various organic reactions, such as in the preparation of urethane foams and in oxyalkylation reactions.

It has been discovered that a composition consisting essentially of an unpurified reaction product and a carrier therefore prepared by reacting together an excess of certain alcohols with certain antimony and bismuth compounds to be described in detail hereinafter is entirely satisfactory for use at a catalyst in organic reactions where the above-described pure known compounds of antimony and bismuth were used heretofore. As is well known, even small amounts of impurities will often radically affect a catalyst and in turn the progress of the catalyzed reaction, and thus the above discovery is suprising and unexpected in view of the teachings of the art.

It is an object of the present invention to provide an improved process for the oxyalkylation of an active hydrogen-containing material wherein the material is reacted together with an alkylene oxide in the presence of the novel catalyst composition of the present invention.

Still other objects and advantages of the present invention will be apparent to those skilled in the art upon reference to the following detailed description and the examples. In accordance with the present invention, a catalytic composition consisting essentially of a reaction product and a carrier therefor is prepared by reacting together an alcohol having at least three hydroxyl groups selected from the group consisting of:

(A)

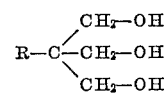

and (B)

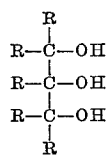

and at least one compound containing a metallic element selected from the group consisting of antimony and bismuth, wherein R is a noninterfering substituent selected from the group consisting of hydrogen, halogen, alkyl, substituted alkyl, aryl, substituted aryl and mixtures thereof. The alkyl or aryl groups may contain, for example, 1–20 carbon atoms, and preferably 1–8 carbon atoms when the group is alkyl. The preferred substituted alkyl and aryl groups are the hydroxyalkyl and hydroxyaryl groups. The reaction mixture consists essentially of the alcohol and the compound containing a metallic element in a ratio providing substantially more than one mole of the alcohol for each unit atomic weight of the metallic element and preferably the alcohol is present in an amount to provide a reaction medium during the reaction and to act as a carrier for the resultant reaction product. The reaction mixture after completing the reaction contains excess unreacted alcohol as the carrier for the reaction product and the reaction product is present therein.

It is not necessary that the reaction mixture be purified and the resultant antimony or bismuth compound be isolated in the pure state before use as a catalyst. It has been discovered that the unpurified reaction mixture is entirely satisfactory for use as a catalytic composition in catalyzing organic reactions of the same type for which the pure antimony and bismuth compounds described herein have been used heretofore, and in fact the reaction mixture is often preferable to the pure compound. For instance, surprisingly the crude reaction mixture containing the resultant organic antimony or bismuth compound present in an excess of the alcohol reactant will dissolve much more readily in the reaction mixture to be catalyzed and often without formation of a two phase system as is true with the pure antimony or bismuth compounds. Thus, using the composition of the present invention as a catalyst assures more predictable, reproducible and trouble free results in the catalyzed process as well as allowing the catalyst to be produced at a much lower cost.

Illustrative alcohols which can be used in the present invention include pentaerythritol, dipentaerythritol, polypentaerythritol, trimethylolpropane, trimethylolethane, trimethylolbutane, trimethylolisobutane, trimethylolpentane, trimethylolhexane, trimethyloloctane, trimethylolnonane, trimethylolundecane, trimethylolheptadecane, trimethylolpropene, trimethylolbutene, trimethylolpentene, glycerol, sorbitol, hexanetriol, butanetriol, and the like. The foregoing alcohols may be substituted with non-interfering substituents such as chlorine, bromine, fluorine, iodine, alkyl, and aryl substituents such as phenyl, naphthyl, etc. When a trimethylolalkane is employed, the alkyl group preferably contains 1–10 carbon atoms, although up to 15 or 20 carbon atoms may be used in some instances. 1,2,3-trihydroxy-2-phenylpropane can be used.

Typical trivalent antimony or bismuth compounds which can be employed in the present invention include antimony trioxide, antimony trichloride, antimony oxychloride, bismuth trioxide, bismuth trichloride, bismuth oxychloride, and a compound having the following structural formula:

wherein M is antimony or bismuth and $R_1$ is an anion of an alcoholate preferably having less than 13 carbon atoms. Among the latter compounds are esters made by reacting an epoxide with antimony or bismuth trichloride to produce a beta-chloroantimonous acid or a beta-chlorobismuthous acid. Specific examples of these beta-chloro compounds are tris(2-chloroethyl) antimonite, tris(2-chlorobutyl)antimonite, tris(2-chloro-2-phenylethyl)antimonite, tris(2 - chloroethyl)bismuthite, tris(2 - chloropropyl)bismuthite, etc. Other esters include those made by the reaction of organic monohydroxy compounds with antimony or bismuth trioxide, such as tris(2-ethylhexyl)antimonite, tris(n-octyl)antimonite, tribenzyl antimonite, triphenyl antimonite, tris(2-ethylhexyl)bismuthite, tris(n-octyl)bismuthite, tribenzyl bismuthite, triphenyl bismuthite and the like.

The time and temperature of reaction are not critical and will vary depending upon the reactants employed, degree of completion of reaction desired, etc. Usually, the reaction can be continued from about 10 minutes to 10 to 30 hours or longer at a temperature of about 50–300° C., and preferably from about 45 minutes to about 4 hours, at a temperature of about 130–210° C. At higher reaction temperatures shorter reaction times may be employed, and vice versa. The reaction product thereby obtained may not be purified, and the entire reaction mixture may be used as a catalyst composition.

The alcohol reactant is employed in substantial excess of that amount theoretically required to react with the antimony or bismuth compound. The amount of this excess may vary over wide ranges, but generally it is desired that the reactant be present in a ratio of at least 1.5 and preferably two to four or more moles of the alcohol for each unit atomic weight of antimony or bismuth employed as a reactant. The alcohol should be present in the reaction mixture in an amount to provide a reaction medium during the reaction and to act as a carrier for the reaction product after completing the reaction. A preferred method of operation is to prepare the antimony or bismuth ester directly in the alcohol component to be used in the preparation of a resin. In this way a separate catalyst preparation step is eliminated. The catalyst component can be prepared in the course of heating the alcohol component. Hence, it is evident that extremely large molar ratios of alcohol to metallic compound are contemplated, even 100 to 1 and greater.

A solvent is not necessary and it is preferred that the excess alcohol reactant be used as the solvent. However, if it is desired a solvent may be used provided it is inert and it does not detrimentally affect the reaction product or its use as a catalyst. A solvent may have a boiling point above 150° C. and it should be substantially unreactive with the reactants or reaction products under the condition of the reaction, and it should not form stable reaction products under the conditions of the reaction.

The process of the present invention is highly satisfactory for the preparation of reaction mixtures from an alcohol such as trimethylolpropane, trimethylolethane, glycerol, and pentaerythritol, and an antimony or bismuth compound mentioned herein. Reaction mixtures prepared from an antimony compound and trimethylolpropane are often preferred catalysts for use in organic reactions, including formulations for foam alkyds or urethane foams, oxyalkylation reactions, etc. The process of the invention is capable of preparing unpurified reaction mixtures from an antimony compound and trimethylolpropane in excellent yield and the resultant product is as satisfactory as pure trimethylolpropane antimonite in the catalysis of organic reactions.

The process described herein is especially useful in the preparation of reaction mixtures from antimony or bismuth compounds and normally solid polyalcohols such as trimethylolpropane. The trimethylolpropane is present in excess in the molten reaction mixture, and, upon completion of the reaction at elevated temperature, the trimethylolpropane-antimony reaction product is dissolved in the excess molten trimethylolpropane which acts as a solvent or suspension medium. By cooling the reaction mixture to a point where it is viscous but still pourable, the reaction product separates out in the form of fine crystals which are held in uniform suspension. The viscous reaction mixture then may be solidified quickly so as to form a solid material with fine crystals of the reaction product distributed substantially uniformly therethrough. The solid product may be ground to particles of a desired size, and it is in a very convenient form for use as a catalyst.

During the reaction in instances where an oxide of the desired metal is used, the water of reaction may be removed by distillation, or preferably by distillation under reduced pressure. For instance, a reduced pressure of about 20–30 millimeters of mercury absolute at a reaction temperature of about 160–185° C. has been found to be very satisfactory when preparing a reaction mixture from trimethylolpropane and an antimony compound. However, other temperatures of reactions and other reduced pressures may be selected as necessary to assure the removal of the water of reaction efficiently and to provide a reaction mixture at the completion of the reaction which is substantially free of water. In such instances, it is desirable that the reaction be continued at the reaction temperature and under the reduced pressure until water is no longer removed.

When catalyzing organic reactions with the composition of the invention, there is usually no need to change prior art practice with the exception of substituting the catalyst composition of the invention for the pure antimony or bismuth compounds formerly used for this purpose. For example, urethane foams may be prepared following prior practice with the exception of reacting the polyethers and/or alkyd resins together with a polyisocyanate in the presence of a catalytic amount of the catalyst composition of the invention. Similarly, where an active hydrogen-containing material containing hydroxyl groups is reacted together with an alkylene oxide to produce the oxyalkyl derivative, the prior art practice need be changed only to the extent of substituting a catalytic amount of the catalyst composition of the inventions for the catalyst previously used.

The nature of the alcohol-metallic compound reaction product which is present in the reaction mixture is not fully understood at the present time. However, it is known that when the metallic compound is an oxide, water of reaction is given off and presumably the reaction is between the hydroxyl groups of the alcohol and the metallic element to form

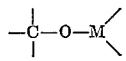

linkages, where M is the metallic element. Since an excess of alcohol is used it is not possible at this time to say whether or not the metallic element is attached to only one oxygen atom or more of any given alcohol molecule to satisfy its trivalent nature. It is possible that the metallic element is attached to up to three separate alcohol molecules through the above described linkages, and that this explains the marked increase in solubility and other favorable characteristics of the reaction product of the invention.

The foregoing detailed description and the following specific examples are for purposes of illustration only, and are not intended to limit the invention.

EXAMPLE 1

This example illustrates the preparation of a reaction product in accordance with the present invention from antimony trioxide and glycerol which is suitable for use as a catalyst in organic reaction.

16 moles of glycerine and 1 mole of antimony trioxide are charged to a 3 liter, 3-necked flask. The temperature is raised to 160° C., at which temperature water is driven off and the reaction proceeds. When the water ceases to exude, a vacuum is applied to remove additional quantities of reaction water. When further water ceases to exude, the vacuum is broken with inert gas. The resultant product is decanted, cooled, and stored for use as a catalyst without further purification or removal of the excess glycerol.

EXAMPLE 2

This example illustrates the preparation of a catalyst which is the reaction product of antimony trioxide and trimethylolpropane.

Reactants are charged to a typical resin reactor (glass or stainless steel) in the molar ratio of 4 moles of trimethylolpropane to 1 mole of antimony trioxide ($Sb_2O_3$). Heat is applied and the charge melts. As the charge melts, agitation as applied, and thereafter the temperature is raised to 160–185° C. Vacuum (20–30 millimeters of mercury absolute) is applied to remove the reaction water as the reaction proceeds.

When the water of reaction ceases to exude, the vacuum is broken with inert gas and the reaction product is cooled to a point where a thick slurry exists (90–120° C.). The reaction product without further purification is then discharged into a suitable container such as a steel container where it is allowed to cool to room temperature. Subsequently, the product is coarsely ground for use as a catalyst without further purification being necessary.

It is desirable to decant the reactor contents at the thick slurry stage so that phase separation of the reaction product, which is in the form of crystals suspended in the fused excess unreacted trimethylolpropane carrier, does not occur during periods of no agitation. When this is done, clear needle-like crystals of the reaction product of trimethylolpropane and antimony trioxide may be seen distributed uniformly throughout the solidified trimethylolpropane carrier. Thus, a substantially uniform homogenous product is produced which is highly useful as a catalyst.

EXAMPLE 3

Using the same procedure as described in Example 2, a catalyst composition is prepared by reacting six moles of trimethylolethane and one mole of antimony trioxide.

EXAMPLE 4

35.5 moles of pentaerythritol and 17.7 moles of antimony trioxide are mixed and gradually heated to the temperature range of one hundred and sixty to one hundred and sixty-five degrees centigrade. Vacuum (about twenty-three millimeters of mercury absolute) is applied for one hour and ten minutes. The distillation of water begins at one-hundred and sixty-two degrees centigrade. When the water of reaction has been removed, the reaction products are discharged into a suitable container where it is allowed to cool to room temperature.

EXAMPLE 5

This example illustrates the application of the principles of this invention to a commercial polyhydric component, a polyoxy propylene derivative of trimethylolpropane, having the following structural formula

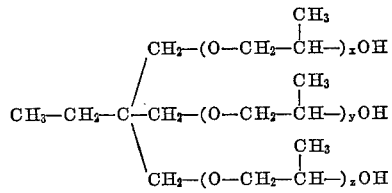

Twenty moles of pentaerythritol, 12.2 moles of the above-identified commercial polyoxy propylene derivative of trimethylolpropane are blended with ten moles of antimony trioxide and gradually heated to the temperature range of one hundred and sixty to one hundred and seventy degrees centigrade. Vacuum (twenty to twenty-five millimeters of mercury absolute) is maintained on the reaction mixture for two hours and fifteen minutes to insure complete removal of the water of reaction. The reaction product is discharged into a suitable container and allowed to cool to room temperature.

Using the procedures of the foregoing examples, bismuth compounds corresponding to these antimony compounds are prepared using the ratios of alcohol to bismuth trioxide shown in the following examples.

| Example No. | Alcohol | Ratio of alcohol to bismuth trioxide |
|---|---|---|
| 6 | Glycerol | 10:1 |
| 7 | Trimethylolpropane | 4:1 |
| 8 | Trimethylolethane | 5:1 |
| 9 | Pentaerythritol | 3:1 |

Using the procedure of Example 1, additional catalyst compositions are prepared in accordance with the invention using antimony and bismuth compounds other than the oxides. The specific metallic compound as well as the ratios of glycerol to metallic compound are shown in the following examples.

| Example No. | Metallic compounds | Ratio of glycerol to metallic compound |
|---|---|---|
| 10 | Antimony trichloride | 4:1 |
| 11 | Antimony oxychloride | 4:1 |
| 12 | Tris(2-chloroethyl)antimonite | 3:1 |
| 13 | Bismuth trichloride | 4:1 |
| 14 | Bismuth oxychloride | 4:1 |
| 15 | Tris(2-chloropropyl)bismuthite | 2:1 |

EXAMPLE 16

This example illustrates the effectiveness of the reaction product of the present invention without purification as a catalyst in oxyalkylation reactions.

One approach to produce a polyester suitable for urethene foams is to react a polyol, acid anhydride and an excess of alkylene oxide to yield a neutral ester. For example, ethylene glycol, maleic anhydride and propylene oxide may be reacted to yield a substantially neutral ester. In such reactions, it is desirable to react as much of the alkylene oxide as possible for reasons of viscosity and economics.

The following data illustrate the effectiveness of the reaction product of trimethylolpropane and antimony trioxide as prepared in Example 2, when compared with other conventional prior art catalysts for such a reaction, and when using the same polyol, anhydride and alkylene oxide.

| Catalyst: | Reacted moles alkylene oxide per mole anhydride |
|---|---|
| Sodium acetate | 1.8 |
| Sodium hydroxide | 1.8 |
| Triethylamine | 2.1 |
| Pyridine | 1.75 |
| The reaction product of trimethylolpropane and antimony trioxide prepared in accordance with Example 2 | 3.5–4.0 |
| BF$_3$-etherate | 3.95 |

The above results indicate that the reaction product of trimethylolpropane and antimony trioxide prepared in accordance with Example 2 is a very effective catalyst for oxyalkylation reactions. In this respect, it is superior to sodium acetate, sodium hydroxide, triethylamine and pyridine, and about equivalent to BF$_3$-etherate. However, it has far greater handling ease than BF$_3$-etherate. Thus, the reaction product of the present invention is much more effective and desirable than the usual prior art catalysts for oxyalkylation reactions.

The methods of this invention can also be applied to the reaction of the antimony and bismuth compounds with dihydric alcohols. However, the resulting compositions are much less desirable for the preparation of polyurethanes, polyesters, etc. However, the following examples exemplify such preparations.

EXAMPLE 17

Nine moles of propylene glycol and one mole of antimony trioxide are admixed and heated to a temperature range of one hundred and seventy to one hundred and seventy-five degrees centigrade. The water of reaction is removed from the composition over a period of three hours and fifteen minutes during which time the temperature of the reaction mixture rises to one hundred and eighty-seven degrees centigrade. The reactor contents are poured into a container and cooled to room temperature.

EXAMPLE 18

Five moles of diethylene glycol are mixed with one mole of antimony trioxide and heated to the temperature range of one hundred and ninety to two hundred degrees centigrade. Vacuum (fourteen millimeters mercury absolute) is applied and the water of reaction is removed over a period of five and one-half hours, after which the reaction mixture is poured into a container and cooled to room temperature.

The active hydrogen-containing materials for use in the oxyalkylation reaction include polyhydric alcohols of the type described hereinafter, and polyesters, polyethers, and mixtures thereof.

The polyesters are the reaction products of a polyhydric alcohol and a polycarboxylic compound, said polycarboxylic compound being either a polycarboxylic acid, a polycarboxylic acid anhydride, a polycarboxylic acid ester, a polycarboxylic acid halide or mixtures thereof. Among the polycarboxylic compounds which may be used to form the polyester are: maleic acid; fumaric acid; phthalic acid; tetrachlorophthalic acid; and aliphatic acids such as oxalic, malonic, succinic, glutaric, adipic, and the like. Additional polycarboxylic compounds which may be used to form the polyester are Diels-Alder adducts of hexahalocyclopentadiene and a polycarboxylic compound, wherein the halogen is selected from the group consisting of chlorine, bromine, fluorine and mixtures thereof, for example: 1,4,5,6,7,7 - hexachlorobicyclo (2.2.1) - 5 - heptene - 2,3 - dicarboxylic acid; 1,4,5,6-tetrachloro - 7,7 - difluorobicyclo(2.2.1) - 5 - heptene-2,3 - dicarboxylic acid; 1,4,5,6,7,7 - hexabromobicyclo (2.2.1) - 5 - heptene - 2,3 - dicarboxylic acid; 1,4,5,6-tetrabromo - 7,7 - difluorobicyclo(2.2.1) - 5 - heptene-2,3 - dicarboxylic acid; etc. Mixtures of any of the above polycarboxylic compounds may be employed.

The polyhydric alcohols for use as active hydrogen-containing materials, as well as for the preparation of polyesters include ethylene glycol, 1,4-butanediol, diethylene, glycol, propylene glycol, and the like, glycerol, hexanetriol, butanetriol, trimethylol propane, trimethylol ethane, pentaerythritol, and the like. The ratio of the polyhydric alcohol such as glycol to the polybasic acid can be expressed as the hydroxyl-carboxyl ratio, which may be defined as the number of moles of hydroxyl groups to the number of moles of carboxyl groups in a given weight of resin. This ratio may be varied over a wide range. Generally, however, a hydroxyl-carboxyl ratio of between 1.5:1 to 5:1 is employed.

The polyethers employed are the reaction products of (1) a polyhydric alcohol and/or a polycarboxylic acid, and (2) a monomeric 1,2-epoxide possessing a single 1,2-epoxy group, such as, for example, propylene oxide. The polyhydric alcohols and polycarboxylic acids which may be employed are any of the polyhydric alcohols and polycarboxylic acids hereinbefore listed. Examples of monomeric 1,2- epoxides include ethylene oxide, propylene oxide, butylene oxide, isobutylene oxide, 2,3-epoxyhexane, epichlorohydrin, styrene oxide, glycidyl ether, glycidyl methyl sulfone, glycidyl methacrylate, glycidyl benzoate, glycidyl sorbate, glycidyl allyl phthalate, and the like. The preferred monoepoxides are the monoepoxide-substituted hydrocarbons, the monoepoxy-substituted ethers, sulfides, sulfones and esters wherein the said compounds contain no more than eighteen carbon atoms.

The alkylene oxides for use in the reaction process of the invention are the foregoing monomeric 1,2-epoxides, particularly those compounds containing 2 to 6 carbon atoms.

The catalyst compositions of the invention are employed in a catalytic amount. Generally, the proportion of metal compound can vary in the range of 0.05 to 0.15 part by weight of metal per part of active hydrogen-containing material.

The alkylene oxides can be reacted with the hydroxyl groups of the active hydrogen-containing material in various proportions, generally in the range of one to 100 moles of alkylene oxide per hydroxyl group, more usually in the range of one to 10 moles of alkylene oxide per hydroxyl group.

While the invention has been described with reference to certain specific embodiments, it will be recognized by those skilled in the art that many variations are possible without departing from the spirit and scope of the invention.

I claim:

1. In a process for the oxyalkylation of a polyester of a polyhydric alcohol and the polycarboxylic compound, wherein the polyester is reacted with an alkylene oxide of 2 to 6 carbon atoms to produce an oxyalkylated product, the improvement which comprises conducting the reaction in the presence of a catalytic amount of a catalytic composition consisting essentially of a metal alcoholate containing

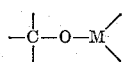

linkages and a carrier therefor, prepared by reacting together an alcohol having 3 to 6 hydroxyl groups and 3 to 13 carbon atoms and selected from the groups consisting of:

A) 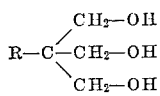

and (B) 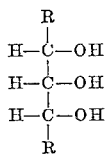

and at least one compound containing a metallic element selected from the group consisting of antimony trioxide, antimony trichloride, antimony oxychloride, bismuth trioxide, bismuth trichloride, bismuth oxychloride, and a compound having the following structural formula:

wherein R is independently selected from the group consisting of hydrogen, alkyl, hydroxyalkyl and aryl, $R_1$ is an anion of an alcoholate having less than 13 carbon atoms, and M is a metallic element selected from the group consisting of antimony and bismuth, the reaction mixture for preparing the catalytic composition consisting essentially of the alcohol and the compound containing a metallic element in a ratio which provides at least 1.5 moles of the alcohol for each unit atomic weight of the metallic element, the alcohol being present in the said reaction mixture in an amount to provide a reaction medium during the reaction and to act as a carrier for the resultant reaction product, the said reaction mixture after completing the reaction containing excess unreacted alcohol as the carrier for the reaction product and the reaction product being present therein.

2. The process of claim 1 wherein the compound containing the metallic element is antimony trioxide.

3. The process of claim 1 wherein the compound containing the metallic element is antimony trioxide and the alcohol is a trimethylolalkane.

4. The process of claim 1 wherein the compound containing the metallic element is antimony trioxide and the alcohol is trimethylolpropane.

5. The process of claim 1 wherein the compound containing the metallic element is bismuth trioxide.

6. The process of claim 1 wherein the compound containing the metallic element is bismuth trioxide and the alcohol is a trimethylolalkane.

7. The process of claim 1 wherein the alkylene oxide is propylene oxide.

References Cited
UNITED STATES PATENTS 3,109,853   11/1963   Worsley et al. _____ 260—446

JAMES A. PATTEN, Primary Examiner

E. J. SKELLY, Assistant Examiner

U.S. Cl. X.R.

252—431; 260—75, 2.5, 446, 447, 475, 485